United States Patent [19]

Le Sage et al.

[11] Patent Number: 4,635,950
[45] Date of Patent: Jan. 13, 1987

[54] TRANSPORTABLE HOT FAT CONTAINER

[76] Inventors: Richard Le Sage, 123 Knollwood Dr., Redwood Falls, Minn. 56283; Eugene N. Reshanov, 1309 Florida Ave. North, Golden Valley, Minn. 55427; Richard A. Schlemmer, Rte. #3, Box 76, Redwood Falls, Minn. 56238

[21] Appl. No.: 776,371

[22] Filed: Sep. 16, 1985

[51] Int. Cl.$^4$ ............................................. B62B 1/10
[52] U.S. Cl. ................................ 280/47.26; 220/469; 280/47.33
[58] Field of Search ............. 280/47.26, 47.24, 47.33; 184/1.5; 110/240, 241; 220/468, 469

[56] References Cited

U.S. PATENT DOCUMENTS

| | | | |
|---|---|---|---|
| 2,572,486 | 10/1951 | Isaac | 280/47.26 |
| 3,041,084 | 6/1962 | Stehman | 280/47.24 |
| 4,050,708 | 9/1977 | Samardzija et al. | 280/47.26 |
| 4,274,645 | 6/1981 | Ferguson et al. | 280/47.26 |

Primary Examiner—David M. Mitchell
Attorney, Agent, or Firm—Schroeder & Siegfried

[57] ABSTRACT

A hot fat transporting vehicle consisting of a normally upright container, having an inlet port at its top end to facilitate the collection of hot fats, and a means for transporting said container safely. The container is held stable while in its upright position by the cooperative supporting action of the outwardly extending wheels and support legs connected thereto, said wheels being carried by an axle transversely mounted between a pair of axle struts. For increased stability, the wheels and support legs extend downwardly and outwardly beyond the vertical confines of the container. Further safety is provided by a baffle plate which is constructed and arranged to function as a safety shield from the hot container at all times. The baffle plate, along with various conveniently located insulated handles, and the port covering means provide for safe transportation of the hot fats upon said wheels to a main storage vat.

20 Claims, 6 Drawing Figures

U.S. Patent  Jan. 13, 1987  4,635,950
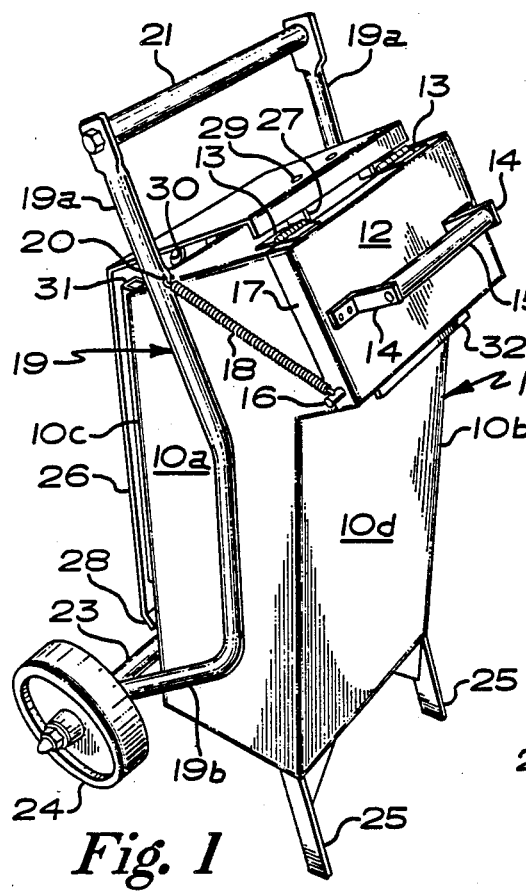
Fig. 1
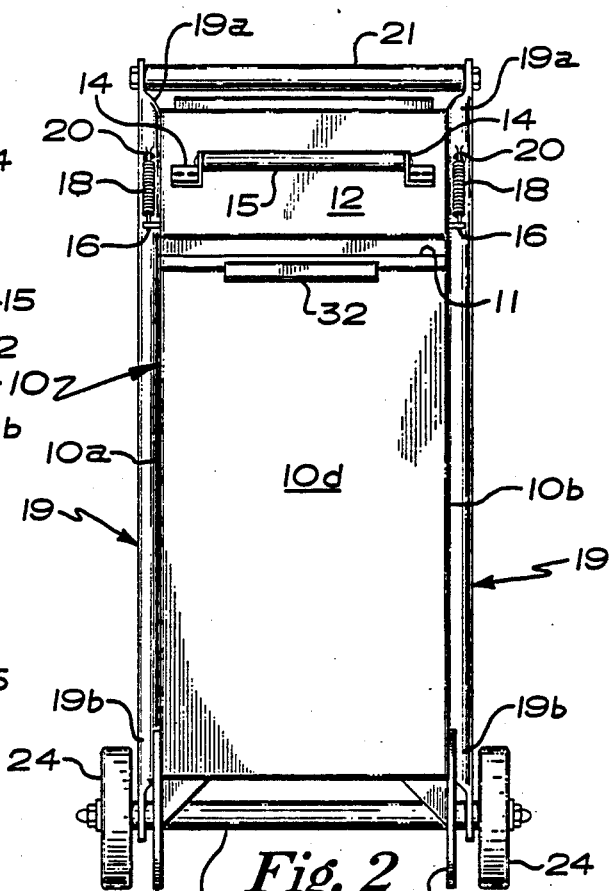
Fig. 2
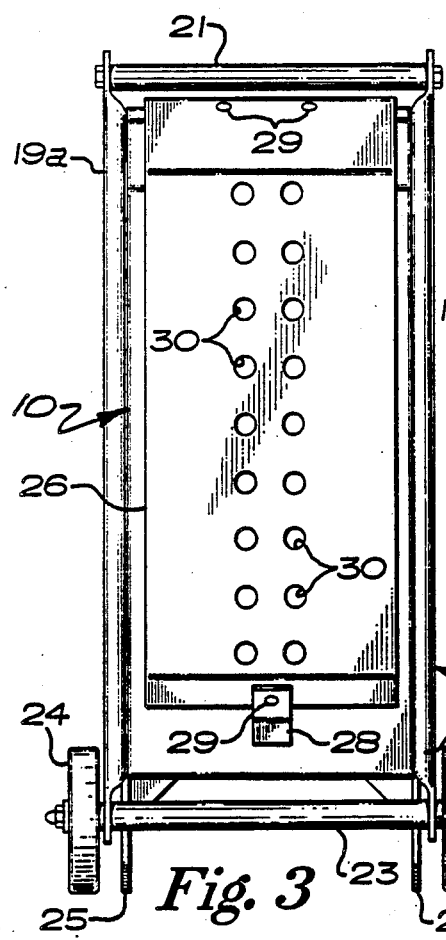
Fig. 3
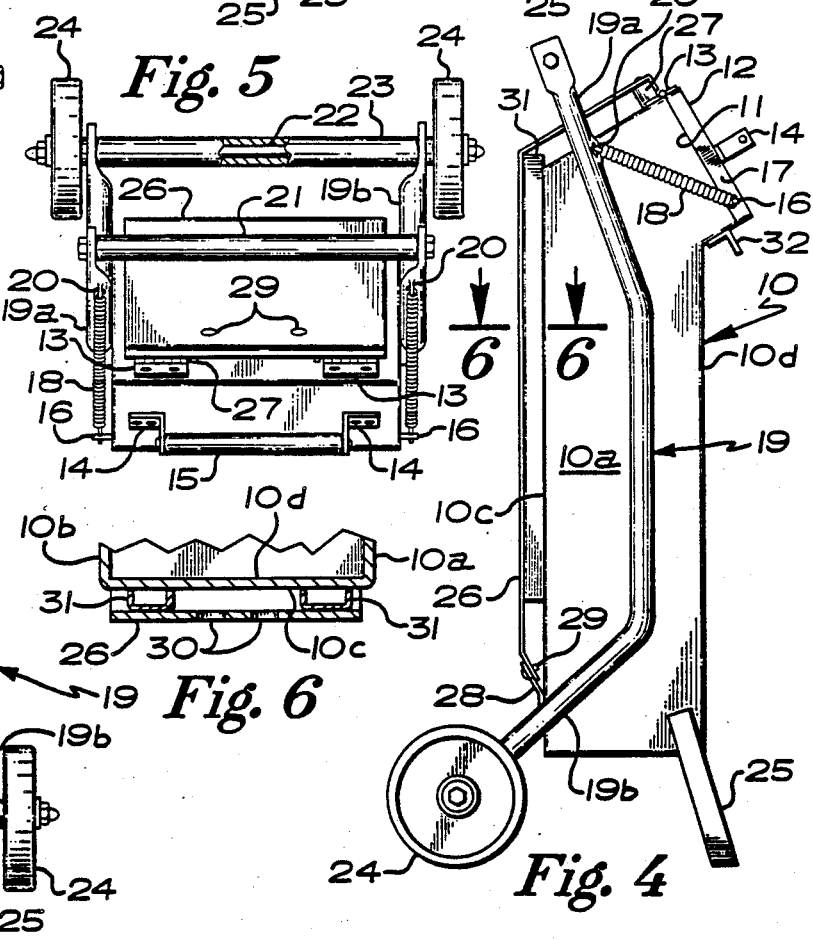
Fig. 5
Fig. 6
Fig. 4

TRANSPORTABLE HOT FAT CONTAINER

BACKGROUND OF THE INVENTION

Commercial restaurants have expanded in the past years to become large volume businesses, offering services to thousands of people each day. To supply the large volume demand for food services, commercial restaurants have resorted to cooking on large fryers and offering fast food services. Consequently, the volume of hot fats and greases accumulated in restaurants has also increased as the volume of food services have expanded. Commercial restaurants cannot dispose of the hot fats and greases through their drainage system since the grease eventually settles and clogs the drain pipes. Therefore, a need has arisen to provide a safe effective means of disposing of the large volumes of hot fats and greases.

Safe handling of the hot fats and greases accumulated by commercial restaurants has historically been a problem since anytime a person handles a substance that is scalding hot there is a high risk of serious burning injuries. Most often, commercial restaurants maintain a large storage vat outside the restaurant into which the hot fats are emptied. It follows that the person in charge of disposing of the hot fats and greases not only must safely empty the large fryers into a container, but must also transport the same some distance to the main storage vat. Throughout all this handling the container becomes quite hot, and contact with the container must be avoided to prevent serious burning injury.

In transportation of the container to the main storage vat, the operator may often be required to transport the container across snow, up stairs, or across uneven or rough terrain to reach the main storage vat. Therefore, the container must also provide a stable means of transportation and support, and a means of preventing contact with the hot container.

Safety is the primary objective sought when handling the hot fats and greases, thus it is imperative that contact with hot fats and greases or the hot container be avoided at all times. Therefore, it is also the primary objective of the invention applied for herein to provide a safe, effective means of emptying hot fats and greases from frying vessels and transporting the same safely to a main storage vat.

BRIEF DESCRIPTION OF THE INVENTION

The primary application of our hot fat transport vehicle is its use by commercial restaurants to transport and dispose of their accumulated hot fats and cooking greases on a daily basis. The hot fat transport vehicle has been designed to reduce the likelihood of serious burning injury due to the associated dangers of working with hot fats and greases.

Our hot fat transport vehicle is essentially comprised of an elongated upright container having an off-set inlet port at its top end to facilitate filling with hot fats and greases, and a transporting means connected thereto designed to provide easy, safe handling of said container. Under normal use, the container is filled in the upright position while being supported above ground level by a pair of support legs and wheels. Both the wheels and the support legs are positioned outside the vertical confines of the container to prevent dangerous possible tippage and spillage of the hot fats and greases with consequent danger of a serious burning accident. The wheels serve two purposes; one is for stable support while the container is in the upright position, and the other is to provide an effective means for transportation of the hot fats and greases.

The transportation means is essentially comprised of a pair of generally arcuately shaped strut members, one each mounted on each of the opposite lateral sides of the container The lower end of each of these strut members carries an axle to which the above mentioned wheels attach. The top end of the strut members are interconnected by an insulated handle. Once the container has been filled with the hot fats and greases, the operator can safely and effectively transport the container to a main storage vat by simply pivoting the container onto the wheels and pulling on the handle which interconnects the top ends of the axle struts.

The container carries a baffle plate on its side adjacent to said wheels and handle. The baffle plate is set back from the container and functions as a heat barrier to prevent the operator from coming in contact with the hot container during transportation. The combination of air flowing between the baffle plate and the container, and insulated washers used in connections therebetween further limit heat transfer to said baffle plate.

The inlet port of the container is equipped with a port covering means which rests in an open or closed position as a function of a pair of springs mounted thereto. The hot fats and greases are introduced into the container while the port cover is in the open position. Then the cover is closed during transportation to prevent any spillage of the containers contents. In normal use, the container will be filled while in its upright position and then transported to a main storage vat. The container is then hooked to the main storage vat by a flange mounted on said containers back side. The cover over the port is then opened and the contents in the container may be dumped into the main storage vat by lifting up on the insulated handle carried by the axle.

It is the primary objective of this invention to provide a safe, effective means of emptying hot grease containing frying vessels and transporting such hot fats and greases to a main storage vat.

It is a further objective of the invention to provide a stable upright hot fat transport vehicle for use by commercial restaurants that is easy to safely fill and transport and is safe to handle.

BRIEF DESCRIPTION OF THE DRAWINGS

A detailed description of one preferred embodiment of a hot fat container is hereafter described with specific reference being made to the drawings in which:

FIG. 1 illustrates a perspective view of an elongated normally upright movable container used for the collection, transportation, and disposal of hot fats and greases from commercial restaurants, said container embodying our invention.

FIG. 2 is a rear elevational view of the upright movable container showing a closure member covering an inlet opening into which the hot fats and greases are introduced.

FIG. 3 is a front elevational view of said upright movable container showing the insulated handles provided for safe maneuverability of the container and a perforated baffle plate functioning as a heat shield.

FIG. 4 is a side elevational view of said upright movable container disclosing the transportation means provided for the container, consisting of a pair of strut members and wheels, and an axle.

FIG. 5 is a top plan view of an upright movable container embodying our invention.

FIG. 6 is a sectional view taken along line 6—6 of FIG. 4, showing a pair of channel supports connected to said baffle plate and extending inwardly toward said container to provide support to said baffle plate.

DETAILED DESCRIPTION OF INVENTION

As shown in FIG. 1 our invention is comprised of an upright container 10 having opposite lateral sides 10a and 10b, a front side 10c, and a back side 10d. The top portion of container 10 angles upwardly and outwardly beyond its back side 10d. The top end of container 10 terminates with an inlet port 11. The hot fats and greases are drained into inlet port 11 and are stored in container 10 while being transported to a main storage vat(not shown).

The inlet port 11 is covered by a port covering means 12 to eliminate any dangerous spillage of hot fats and greases during transportation. The port covering means 12 is connected to said container 10 by a pair of hinges 13. A cover handle 14 is mounted on the outermost face of said port covering means 12, transversely disposed between its lateral edges 17, to facilitate its opening and closing. The grip portion 15 of cover handle 14 is preferably made of an insulating material to minimize heat transfer from said container 10.

Spring rod 16 is transversely mounted through said lateral edges 17 of port covering means 12. A spring 18 is connected to each end of spring rod 16 and extends therefrom adjacent each opposite lateral side, 10a and 10b, of container 10 to each axle strut 19. Springs 18 are connected to axle struts 19 by means of eyelets 20 stamped and punched therein. The springs 18 function to provide over-dead-center operation of port covering means 12, thereby allowing the operator to fill the container 10 while the port covering means 12 rests in the open position, and to close it during transportation.

Axle struts 19 support a transportation means for container 10, and are connected thereto, one each adjacent to each opposite lateral side, 10a and 10b. The upper portion 19a of axle struts 19 extends upwardly and outwardly towards the front side 10c of the container 10. The top ends of axle struts 19 are interconnected by an insulated transport handle 21, which is used to pull container 10 during transportation.

The lower portions 19b of axle struts 19 extend downwardly and outwardly beyond the vertical confines defined by the front side 10c of container 10. The lower ends of axle struts 19 are interconnected by axle 22. Axle 22 carries an insulated axle handle 23 in telescoping relation thereto to facilitate dumping of the hot fats and greases into the main storage vat.

Wheels 24 are mounted on each end of axle 22. In use, the operator will pull on said transport handle 21, thereby causing the container 10 to roll on wheels 24. Wheels 24 are relatively large, preferably 8 inches or larger in diameter, to provide for easier transportation through mud, snow, and up stairs. Wheels 24 also act in cooperative supporting relation to support legs 25 when the container stands in its upright position. Support legs 25 are connected to the lower portion of container 10 and extend downwardly and outwardly therefrom, adjacent its back side 10d to a position outside the vertical confines of the container.

Because container 10 becomes quite hot in normal use, baffle plate 26 has been mounted in contouring relation to container 10. Channel spacer 27 and bracket 28 are used to space the baffle plate 26 away from container 10, and to connect it thereto. The spacing between baffle plate 26 and container 10 allows air to flow freely therebetween, thereby keeping baffle plate 26 relatively cool compared to container 10. The center portion of the baffle plate 26 has a plurality of perorations 30 which function to supplement the air flow around and through the baffle plate 26. Insulated washers 29 are placed between the channel spacer 27, the bracket 28, and the baffle plate 26 to further eliminate the heat transfer from said container 10.

A pair of support channels 31 are mounted to baffle plate 26 and extend inwardly toward the front side 10c of container 10. Support channels 31 strengthen the baffle plate 26 so that the operator may use the baffle plate 26 as leverage if needed. However, the support channels 31 do not normally touch container 10 and therefore do not conduct appreciable heat to said baffle plate. Therefore, heat transfer to the baffle plate 26 is limited and the latter thereby functions as a heat barrier or safety shield for the operator and reduces the likelihood of any serious injuries.

Flange 32 is mounted to the top angling portion of container 10 on its back side 10d, and extends generally outward and normal thereto. Flange 32 functions as a catch mechanism for the main storage vat when the contents of container 10 are to be disposed of. Container 10 is simply positioned so as to hook onto the main storage vat by means of flange 32, and then by grasping the insulated axle handle 23, the operator can tip the container to a position such that the hot fats and greases will safely discharge through inlet port 11 into the interior of the storage vat.

It will be seen from above that the hot fat transport vehicle provides a stable storage receptacle and container for hot fats and greases while in its upright position. It is further apparent that our invention provides a more effective, and safe means for receiving, transporting, and disposing of hot fats and greases normally collected by commercial restaurants than has been available in the past.

In considering this invention it should be remembered that the present disclosure is illustrative only, and the scope of the invention should be determined by the appended claims.

We claim:

1. A means for safely transporting hot fats, comprising:
    (a) a normally upright elongated container having a front side, a back side, and opposite lateral sides;
    (b) said front side of said container having a spaced baffle plate associated therewith;
    (c) a pair of support legs extending generally downwardly from said container adjacent said back side, and constructed and arranged to provide support to said container while in an upright position;
    (d) a transverse axle located adjacent to and outside the vertical confines defined by the front side of said container;
    (e) a pair of wheels rotatably mounted one each on each end of said axle;
    (f) a pair of axle struts mounted to said container and carrying said axle and said wheels in a cooperative container-supporting relation with said support legs when said container is in its upright position;
    (g) an axle handle carried by said axle between said wheels;

(h) a transport handle connected to said container to facilitate transportion of the container upon said wheels;

(i) said container having an inlet port at its upper end constructed and arranged to facilitate the collection of hot fats in said container; and (j) a port covering means mounted to said container to cover said inlet port and being movable between its closed position and open position.

2. The structure defined in claim 1, wherein each of said support legs extends downwardly and outwardly from the lower portions of each said opposite lateral sides adjacent to said back side of said container, and the lower end of said support legs being outside the vertical confines of said container.

3. The structure in claim 1, wherein each of said wheels is outside the vertical confines of said container and mounted on said axle.

4. The structure in claim 1, wherein each of said axle struts:

(k) extend downwardly and forwardly beyond the front side of said container adjacent to the lower portion of each opposite lateral side;

(l) extend in integral part upwardly and outwardly from the top portion of said container toward said front side; and (m) are interconnected at their upper ends by said transport handle.

5. The structure defined in claim 1, wherein said port covering means carries a cover handle and is constructed and arranged to provide over-dead-center operation.

6. The structure defined in claim 5, wherein each of said handles is constructed of an insulating material.

7. The structure defined in claim 1, having a flange mounted on the backside of said container and extending outwardly therefrom at a sharp angle thereto to facilitate the safe dumping of hot fats from said container into a main storage vat.

8. The structure defined in claim 1, wherein said axle handle is tubular and carried by said axle in telescoping relation thereto.

9. The structure defined in claim 1, wherein said baffle plate has a plurality of perforations to provide adequate air flow between said baffle plate and said container.

10. The structure defined in claim 1, and a pair of channel supports mounted on said baffle plate and extending inwardly therefrom towards said container and constructed and arranged to strengthen said baffle plate.

11. The structure defined in claim 1, wherein the lower portions of said wheels and said support legs define a plane substantially parallel to the plane defined by the bottom of said container.

12. The structure defined in claim 1, wherein the upper portion of said container extends outwardly at an angle relative to its said back side.

13. The structure defined in claim 1, wherein said wheels are preferably at least 8 inches in diameter:

14. A hot fat transportation vehicle, comprising:

(a) a normally upright container having a front side, a back side, two opposite lateral sides, and a longitudinal axis between the upper and lower ends of said container;

(b) a baffle plate mounted on said front side of said container in a contouring relation thereto and spaced therefrom;

(c) a pair of axle struts each mounted on said container adjacent one of said opposite lateral sides and constructed and arranged to facilitate safe transportation of hot fats;

(d) an axle mounted between the lower ends of said axle struts and being outside the vertical confines defined by said front side of said container;

(e) a pair of wheels, one each mounted on each end of said axle;

(f) a pair of support legs extending downwardly and outwardly from the lower portion of said container adjacent its said back side and constructed and arranged to be in a cooperative supporting relation with said wheels when said container is in its upright position;

(g) the upper end of said container having an inlet port at its outer end;

(h) an insulated axle handle carried by said axle between said axle struts;

(i) an insulated transport handle transversely mounted between the upper ends of said axle struts and constructed and arranged to facilitate the transportation of the hot fats in said container upon said wheels; and (j) a port covering means mounted to said container and constructed and arranged to cover said port and to move between an open and closed position with respect thereto.

15. The structure defined in claim 14, wherein said support legs are constructed and arranged to extend beyond the vertical confines of said container.

16. The structure defined in claim 14, wherein the lower portions of the said wheels and said support legs are in a plane substantially normal to the longitudinal axis of said container, and said wheels are constructed and arranged to be outside the vertical confines of said container to provide added stability.

17. The structure defined in claim 14, wherein the upper and lower ends of said axle struts extend longitudinally outward toward the front side of said container, said lower ends of said axle struts extending outside the vertical confines of said container.

18. The structure defined in claim 14, and a pair of springs, each being adjacent to one opposite lateral side and constructed and arranged to provide opening and closing of said port covering means in overdead-center operation.

19. The structure defined in claim 14, wherein the upper end portion of said container angles upwardly and outwardly relative to its said longitudinal axis, and a flange mounted to the upper portion of said back side of said container and extending generally outward therefrom.

20. The structure defined in claim 14, and a pair of channel supports mounted on said baffle plate and extending inwardly towards said container and slightly spaced therefrom, said channel supports being constructed and arranged to strengthen said baffle plate.

* * * * *